Fig.1.

INVENTOR.
Paul J Turnbull
BY
William R. Piper
ATTORNEY

April 14, 1970  P. J. TURNBULL  3,505,981
ROTARY ENGINE

Filed Dec. 26, 1967  7 Sheets-Sheet 2

Fig. 2.

INVENTOR.
Paul J. Turnbull
BY
William R. Piper
ATTORNEY

April 14, 1970   P. J. TURNBULL   3,505,981
ROTARY ENGINE
Filed Dec. 26, 1967   7 Sheets-Sheet 4

Fig. 4.

INVENTOR.
Paul J. Turnbull
BY William R. Piper
ATTORNEY

United States Patent Office 3,505,981
Patented Apr. 14, 1970

3,505,981
ROTARY ENGINE
Paul J. Turnbull, 2681 Kelly St.,
Hayward, Calif. 94544
Filed Dec. 26, 1967, Ser. No. 693,265
Int. Cl. F02b 53/14, 53/12, 55/08
U.S. Cl. 123—8.47                                      11 Claims

ABSTRACT OF THE DISCLOSURE

The rotary engine uses suitable fuel and comprises two complemental rotary members that face each other. Each member has a circular groove which is semi-cylindrical in cross section so that the two grooves form a circular cylinder. Also each member has two diametrically opposed pistons that are integral with the member and are slidably received in the adjacent portion of the circular groove in the opposing member. Novel means causes the two rotary members to change their speeds with respect to each other while the members are rotating and this will produce relative rotational movement between the pistons of the two members for causing them to simulate intake, compression, power and exhaust strokes of a four cycle engine. A sealing ring is mounted between the two members and it has intake and exhaust ports that communicate with the circular cylinder.

BACKGROUND OF THE INVENTION

The field of invention is for rotary engines in which pistons move in circular cylinders and are accelerated and decelerated with respect to each other while they are rotating about the common axis of the engine. The relative piston movement in each engine usually produces the four strokes corresponding to that of a four cycle engine. The firing of the compressed fuel mixture is automatically done.

The prior art discloses that patents granted since 1903 show essentially four cylinder rotating piston type engines. Numerous shapes have been applied to the engine cylinder, such as toric cylinders and some circular cylinders being cylindrical in cross section. The internal drive mechanisms are usually located at or near the center of the engine or axially to one side or both. This type of engine has had varied applications in the driving mechanisms, such as by means of eccentric parts, geared piston drives, fluid regulation and other forward directing and anti-reversing mechanisms in varied combinations.

SUMMARY OF THE INVENTION

My invention pertains to a prime mover of the internal combustion type. It may also be adapted as a fluid pump or fluid driven motor. An object of my invention is to provide a rotary engine in which the two complementary rotating members have circular grooves that align with each other to form an essentially toroidal cylinder. The two pistons carried by each rotating member are slidably received in the adjacent portion of the circular groove in the other rotating member and novel means are used for causing these pistons to move with respect to each other while the members are rotating to effect chamber displacement and produce the strokes of a four cycle engine. There are four power strokes for each revolution of the two rotating members.

A further object of my invention is to provide a rotary engine in which the two rotors provide a more even heat distribution and thus prevent metal distortion. This permits more heat saturation to these rotating parts and in turn allows more heat loss because of higher engine temperature. The inner and outer portions of the pistons are sealed by a novel arrangement of inner and outer sealing bearings that automatically compensate for any wear among the moving parts. I provide a separate spark plug for each of the four chambers in the circular cylinder. This obviates the overworking of any individual spark plug.

BRIEF DESCRIPTION OF THE DRAWINGS

FIGURES 7-1 to 7-4 inclusive, 8-1 to 8-4 inclusive, and 9-1 to 9-4 inclusive, are diagrammatic illustrations of certain parts of the rotary engine setting forth different positions of these parts during the operation of the engine.

FIGURES 10 to 13 inclusive are additional diagrammatic illustrations showing the different positions of the pistons with respect to each other during the operation of the engine.

FIGURE 14 is a radial section through a portion of one of the rotors and illustrates how each of the four spark plugs is mounted in the engine.

DESCRIPTION OF THE PREFERRED EMBODIMENT

Figure 1:
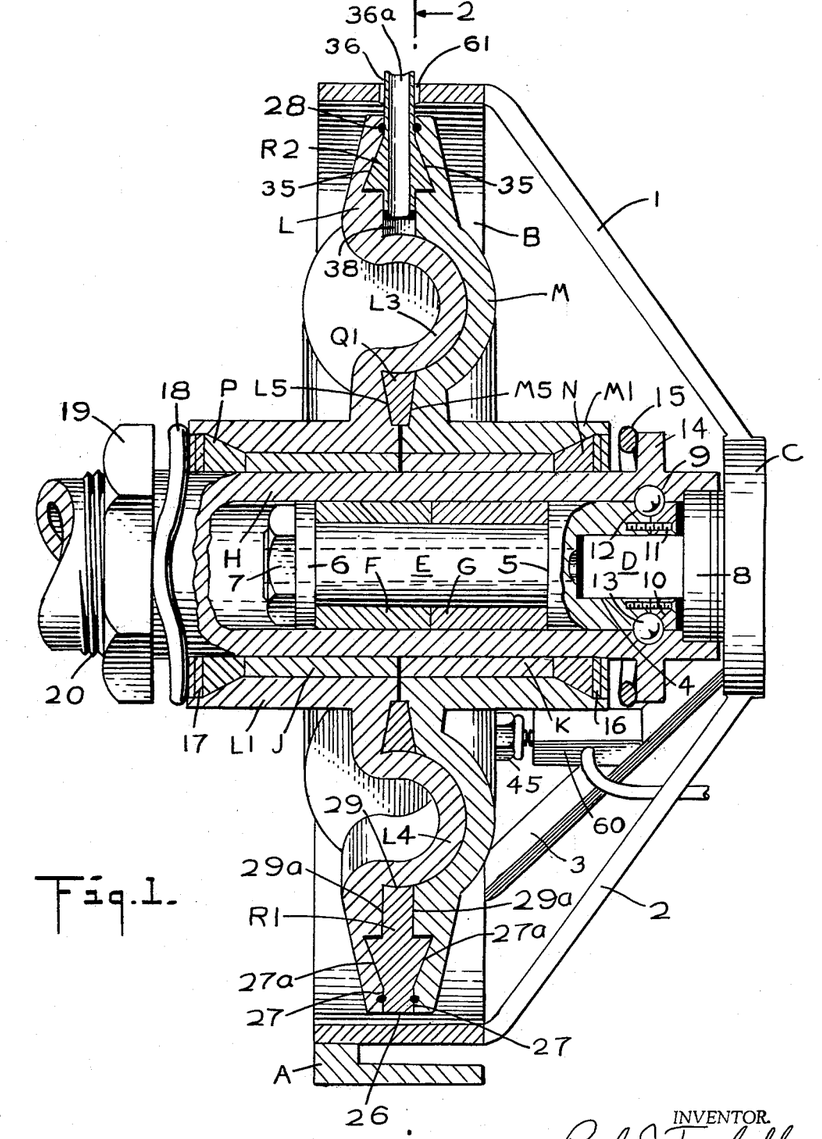
FIGURE 1 is a longitudinal section through the rotary engine and is taken along the line 1—1 of FIGURE 2.
Figure 2:
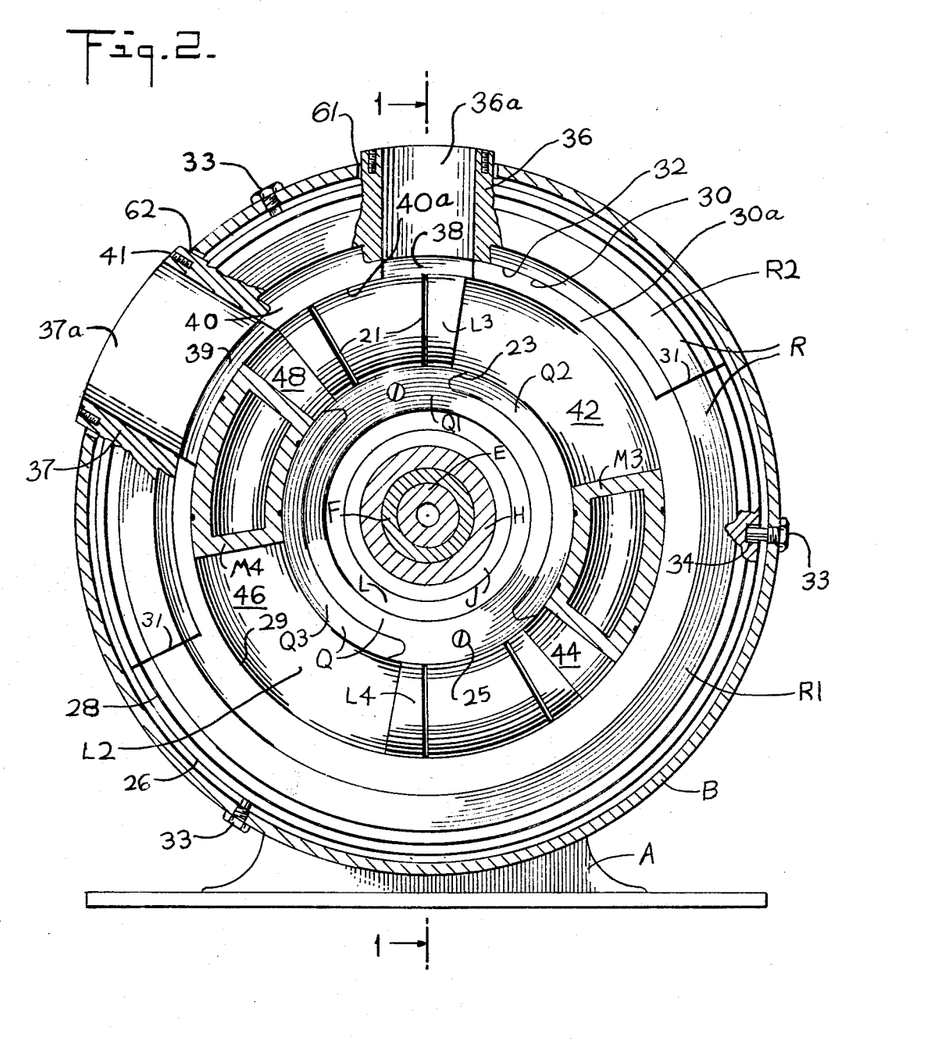
FIGURE 2 is a transverse section through the rotary engine and is taken along the line 2—2 of FIGURE 1.
Figure 3:
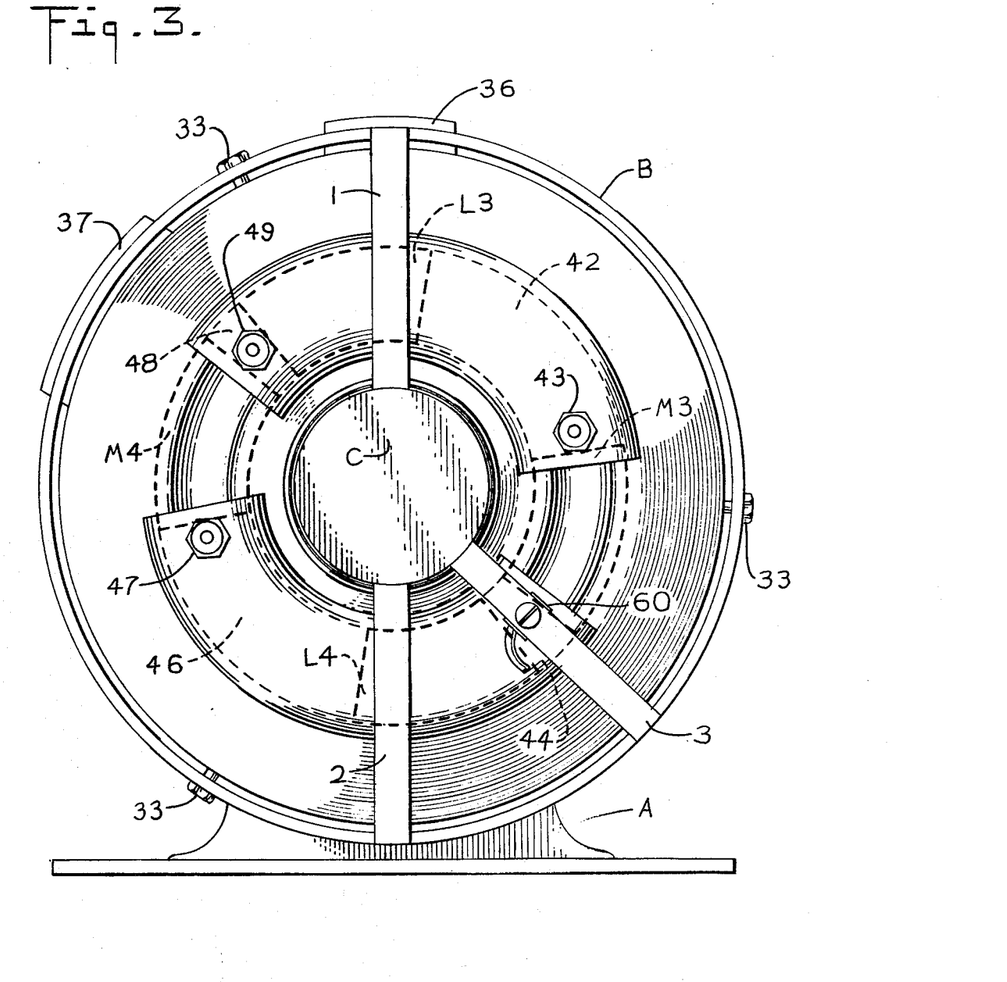
FIGURE 3 is an end elevation of the rotary engine when locking at the right hand end of the engine shown in FIGURE 1. The arcuate pistons are shown in heavier dotted lines and the compartments in lighter dotted lines.
Figure 5:
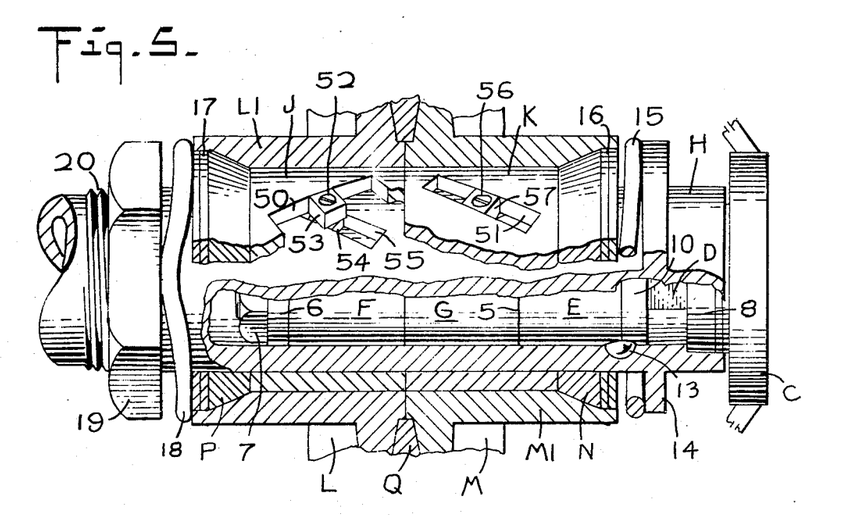
FIGURE 5 is an enlarged longitudinal section of the output shaft and associate parts that operatively connect the rotors to the output shaft, portions being shown in elevation.

In carrying out my invention I provide a base A that supports a stator B, see FIGURES 1 and 2. The stator is in the form of a ring. FIGURES 1 and 3 show the stator B supporting radial arms 1, 2, and 3 that are inclined and have their inner ends welded to a central support C. FIGURES 1 and 5 show the central support C provided with an integral arbor D, that is non-circular in cross section. The axis of the arbor coincides with the axis of the stator ring B.

FIGURES 1 and 2 show a hollow shuttle E that has a non-circular socket 4 at one end for slidably receiving the arbor D. The arbor cannot rotate about its axis and it prevents the shuttle E from rotating. A pair of shuttle sleeve F and G, are mounted on the outer reduced cylindrical portion of the shuttle. The shuttle sleeve G bears against an annular shoulder 5, and a washer 6 is mounted on the shuttle and bears against the free end of the shuttle sleeve F. The shuttle has a threaded end for receiving a nut 7 that bears against the washer 6.

Figure 6:
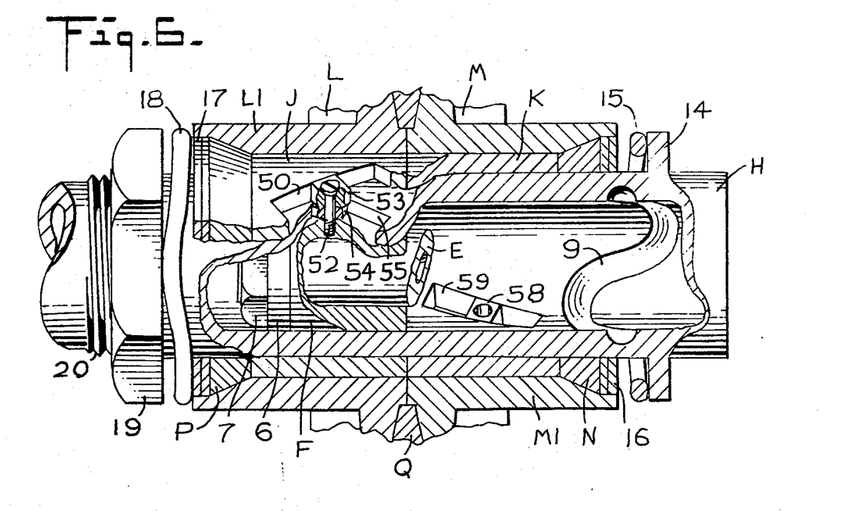
FIGURE 6 is another longitudinal section of the same rotary engine parts shown in FIGURE 5 and further illustrates how the various parts are interconnected.

A hollow output shaft H, see FIGURE 1, is slipped over the two shuttle sleeves F and G, and the right hand end of the shaft is rotatably supported by a bearing 8 which in turn is carried by the fixed central support C. I effect a reciprocatory movement of the non-rotatable shuttle E within the hollow drive shaft H. FIGURE 6 shows the cylindrical bore of the hollow output shaft H provided with a cam groove 9. The shuttle E has an enlarged cylindrical end portion that extends to the right of the shuttle shoulder 5 and this end is capped by a disc-shaped head 10 that has a non-circular central bore for slidably receiving the non-rotating arbor D, see FIGURE 1. Screws 11, or other suitable fastening means, secures the head 10 to the shuttle E. At the juncture between the shuttle head 10 and the shuttle E, I provide half-spherical recesses 12 that are diametrically opposed and receive ball bearings 13. The ball bearings 13 are also received in the cam groove 9 in the hollow output shaft H. The cam groove is so shaped that for each revolution of the output shaft H, the shuttle is reciprocated four full strokes.

Again referring to FIGURE 1, it will be noted that I mount two cylindrical inserts or sleeves J, and K on the outer cylindrical surface of the hollow shaft H. A rotor L has a cylindrical portion L1 that receives the cylindrical insert J and is secured thereto so as to rotate therewith. A rotor M has a cylindrical portion M1 that receives the cylindrical insert K and is secured thereto so as to rotate therewith. The two rotors L and M cooperate with each other in a manner presently to be described.

I provide novel means for yieldingly urging the two rotors L and M toward each other so that they will not only contact each other but the yielding means will compensate for any wear that might take place between the rotors. The output shaft H has an outer annular flange 14, see FIGURE 1, and a compression spring 15 encircles the shaft and bears against the flange. A conical bearing N encircles the output shaft H and bears against a conical seat provided in the cylindrical portion M1 of the rotor M. An annular seal 16 is placed between the conical bearings N and the compression spring 15. Another conical bearing P encircles the shaft H and bears against a conical seat provided in the cylindrical portion L1 of the rotor L. An annular seal 17 bears against the conical bearing P, and another compression spring 18 encircles the shaft H and bears against the seal 17. A nut 19 is mounted on a threaded portion 20 of the shaft H and bears against the compression spring 18 for yieldingly holding it against the seal 17. It will be seen from this construction that the nut 19 may be tightened to the desired extent for causing both compression springs 15 and 18 to exert sufficient yielding force on the conical bearings N and P for causing the latter to urge the complimental rotors L and M toward each other to take up wear automatically.

Figure 4:
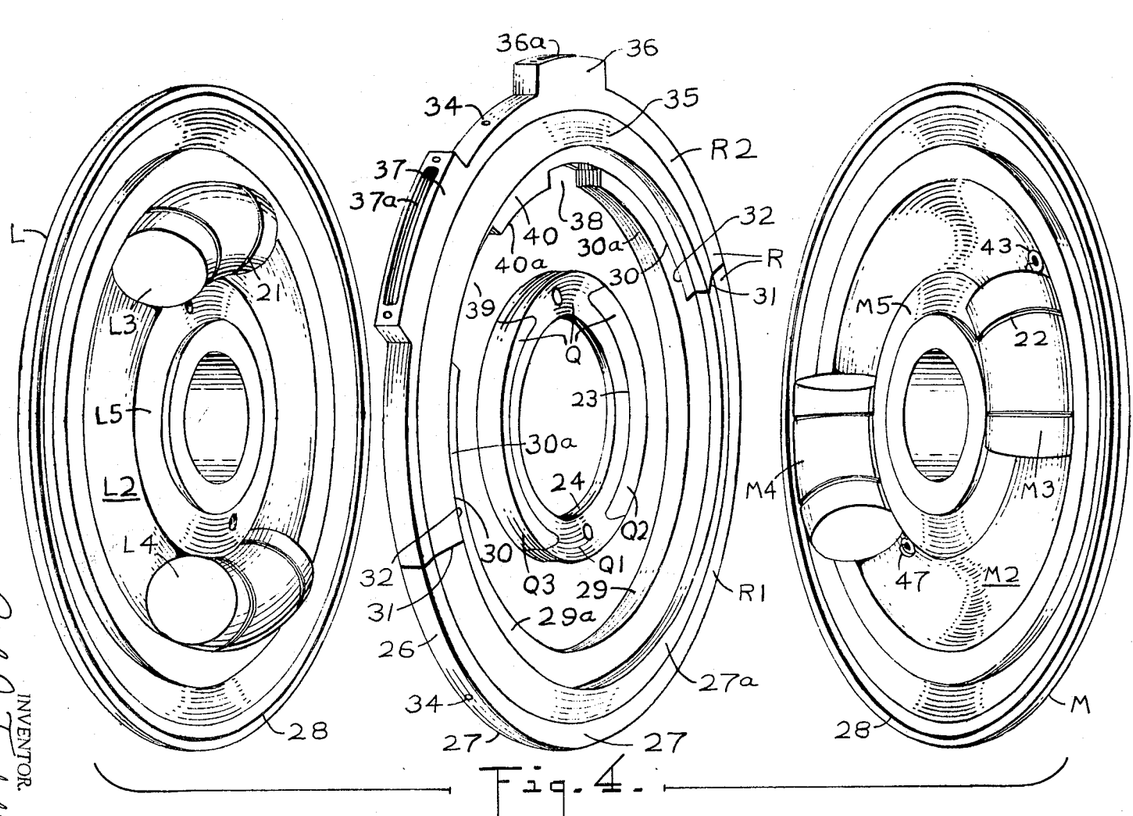
FIGURE 4 is an exploded view of the two rotors and the intermediate ring-shaped bearings, these parts being illustrated by revolving on vertical axes to show internal parts.

I will now describe the novel construction of the two cooperating rotors L and M and the sealing bearings that are mounted between them. In FIGURE 4 I show the two rotors L and M separated from each other and arranged so that the inner surfaces of both rotors are illustrated. The same figure illustrates the inner and outer sealing rings that are placed between the two rotors. The rotor L has an annular groove L2 and two integral pistons L3 and L4 divide the groove into two compartments and are disposed diametrically apart. The annular groove L2 is half cylindrical in cross section. The pistons L3 and L4 have their arcuate axes coinciding with the annular axis of the groove L2. FIGURE 1 is a section through both integral pistons L3 and L4 and illustrates how the cylindrical walls are integral with the rotor L. The two pistons may have grooves 21 formed therein and these grooves have an arc that is slightly more than 180° because the exposed portions of the pistons have a cylindrical surface that extends through an arc of slightly more than 180°.

The rotor M has an annular groove M2 and two integral pistons M3 and M4 that are disposed diametrically apart. The annular groove M2 is half cylindrical in cross section and will slidably receive the pistons L3 and L4 of the rotor L. The pistons M3 and M4 are likewise slidably received in the annular groove L2. The pistons M3 and M4 have their arcuate axes coinciding with the annular axis of the groove M2 and the latter annular axis coincides with the annular axis of the annular groove L2 in the rotor L. The two pistons M3 and M4 may have grooves 22 therein and these grooves would extend through an arc of slightly more than 180° because the exposed portions of the pistons have a cylindrical surface that extends only through slightly more than an arc of 180°.

I provide novel bearing and sealing means between the opposed faces of the two rotors L and M. An inner bearing and sealing insert is indicated generally as insert Q in FIGURES 1, 2 and 4. The insert Q is in three parts. The central part Q1 is in the form of a ring that is received in annular grooves L5 and M5 provided in the rotors L and M, respectively. FIGURE 1 shows that the insert Q1 is wedge-shaped in cross section and that the bottoms of the annular grooves L5 and M5 are similarly inclined. The insert Q has two diametrically opposed arcuate portions Q2 and Q3. These are received in diametrically opposed arcuate slots 23 provided in the central part Q1. The central part Q1 has openings 24, see FIGURE 4, that are diametrically opposed and receive screws 25, see FIGURE 2, that secure this part to the rotor L.

The opposed arcuate portions Q2 and Q3 are wedge-shaped in cross section in identically the same way as the insert Q1 is made wedge-shaped. The compression springs 15 and 18 will urge the two rotors L and M toward each other and they will be forced against the inclined surfaces of the wedge-shaped sides of the inner bearing and sealing ring Q. Since the wedge-shaped arcuate portions Q2 and Q3 become thicker toward their outer peripheries, the yielding force of the rotors L and M in tending to be moved toward each other will create a radical and outwardly directed force on these arcuate portions to form a fluid tight sliding contact with the outer cylindrical peripheries of the pistons M3 and M4. The diametrically opposite portions of the central part Q1 are in non-moving contact with the pistons L3 and L4 and they thereby form a fluid tight seal by this contact.

A further part of the bearing and sealing means between the opposed faces of the two rotors L and M consists of an outer bearing and sealing insert indicated generally at R in FIGURES 1, 2 and 4. The outer insert R is in two parts. Part R1 has a semi-circular portion with an outer peripheral rim 26 that lies flush with the outer rims of the rotors L, and M, note the cross-sectional shape of the part R1 in the lower portion of the sectional view in FIGURE 1. The same part has two outer surface portions 27 that extend inwardly from the rim 26 and are parallel to each other. Circular O-rings 28 for oil sealing are placed in complemental circular grooves in the surfaces 27 and the adjacent surfaces of the rotors L, and M.

The outer surfaces 27—27 have outwardly inclined surfaces 27a—27a of the semi-circular part R1, that extend inwardly from the inner portions of these surfaces and these inclined surfaces bear against similar inclined surfaces provided in the rotors L, and M, see the lower part of the rotors in FIGURE 1. The same FIGURE 1 then shows the part R1 provided with an inner semi-circular portion whose inner periphery 29, contacts with the outer cylindrical surface of the pistons, such as the piston L4. The parallel surfaces 29a—29a disposed adjacent to the inner rim 29 are spaced the same distance apart from each other and lie in the same planes as occupied by the two surfaces 27—27. The yielding force exerted by the compression springs 15 and 18 in urging the two rotors L, and M toward each other will exert an inward force on the inclined surfaces 27a—27a to yieldingly hold the inner rim 29 in contact with the outer cylindrical surfaces of the pistons and thus provide an automatic means for taking up wear between these parts as well as maintaining a fluid tight seal.

Referring again to FIGURES 2 and 4 it will be seen that the part R1 of the outer bearing and sealing insert R has arcuate recesses 30—30 that extend inwardly from the outer rim 26. The inner ends 31—31 of the recesses 30—30 extend radially from the central axis of the rotary engine and they are disposed 180° apart. The arcuate edges of the recesses 30—30 form the outer edges of arcuate tongue-like portions 30a—30a that bear against the inner arcuate edge 32 of a semi-circular part R2 that cooperates with the part R1 to complete the outer bearing and sealing insert R, see FIGURE 4. The part R1 is held from rotating by radial guide pins 33 that are received in threaded bores provided in the stator B, and are slidably received in smooth bores 34, provided in the part R1, see FIGURES 1 and 2. The bores 34 will be enlarged in an angular direction slightly to permit the part R1 to move inwardly slightly when necessary to take up any wear between the inner rim or periphery and the outer surfaces of the pistons.

The upper semi-circular part R2 has a semi-circular rib on each side with outwardly inclined surfaces 35—35 that are similar to the outwardly inclined surfaces 27a—27a of the lower part R1, see FIGURE 1. The upper part R2 also has outwardly extending projections 36 and 37, see FIGURE 4. The radially extending projection 36 has an intake port 36a therein that extends entirely through the upper part R2 and communicates with a space 38 formed between portions of R1, R2 and rotors L and M.

The outwardly extending projection 37 with tapped holes 41, has an exhaust port 37a therein that extend entirely through the upper part R2 and communicates with a second space 39, see FIGURE 2, that in turn communicates with the compartment interiors. The upper part R2 is shown in FIGURE 4 as having an inwardly extending portion 40 that separates the intake space 38 from the exhaust space 39. The outer ends of the tongue-like portions 30a of the part R1, cooperate with the portion 40 to form the opposed walls of the inlet space 38 and the exhaust space 39. The upper part R2 has a guide pin 33, see FIGURE 2, that is slidably received in a bore 34 in the part R2 and the pin is screwed into a threaded bore in the stator B. The guide pins 33 hold the outer bearing and sealing insert R from rotating while the rotors L, and M are free to rotate. The outward and radially extending projections 36 and 37 for the intake and exhaust ports 36a and 37a are received in openings 61 and 62 respectively, provided in the stator B. The inlet 36a may be in communication with a carburetor, not shown, which may be bolted on by tapped holes 41. The inner bearing and sealing insert will rotate with the rotor L. The upper semi-circular part R2 of the outer bearing and sealing insert R, will yieldingly be moved inwardly in a radial direction to hold the inner arcuate edge 40a of the inwardly extending portion 40 in contact with the outer surfaces of the pistons as the latter are moved by the rotors L, and M. The compression coil springs 15 and 18, see FIGURE 1, exert the force for moving the two rotors L and M toward each other and these in turn have the inclined surface portions bearing on the inclined surfaces 35 of the upper part R2 for urging the inner edge 40a of the portion 40, inwardly.

FIGURE 2 shows the pistons L3 and L4 of the rotor L, in elevation and shows the pistons M3 and M4 of the rotor M, in section. A compartment for receiving a combustible gas or the like is formed between the pistons by the combining of the two rotors L2 and M2. These compartments will be constantly changing in capacity as the two rotors L, and M, rotate and as each one will be retarded and speeded up with relation to the other so as to cause each compartment during one complete revolution of the rotors to expand during an "intake" portion of the cycle to draw in a combustible charge from the intake port 36a, then to contract during the "compression" portion of the cycle. This is followed by the igniting of the gas by a spark plug for the "power stroke" portion of the cycle where the size of the compartment will again be enlarged, and finally the compartment will be reduced in size for expelling the burnt gases through the exhaust ports 37a during the "exhaust stroke" portion of the cycle. The cycle is now completed and will be repeated during each complete rotation of the two rotors L and M. At the same time each of the three other compartments formed between the pistons will be proceeding through its four cycle portions of "intake, compression, power stroke and exhaust" for every complete rotation of the two rotors. A tremendous amount of power is thereby delivered by the rotating engine.

In FIGURE 2, and FIGURE 3 I illustrate one position of the various moving parts of the rotary engine. Between the pistons L3 and M3, a compartment 42 is shown as being enlarged to draw in a combustible gas through the inlet port 36a. A spark plug 43 is associated with this compartment. The next compartment 44 is formed between the pistons M3 and L4 and is shown in contracted or compressed form for compressing the combustible gas that had previously been taken in from the intake port 36a. The rotors are rotating in a clockwise direction in FIGURE 2 and I will explain presently how the rotors L and M are rotated with respect to each other for causing the pistons M3 and L4 to compress the gas in the compartment 44. A spark plug 45 is provided for the compartment 44 and may be automatically fired by the means of the timing device 60, for exploding the compressed gas in the compartment to start the power stroke therein; see FIGURE 1.

Next in a clockwise direction from the compartment 44, is the compartment 46 that lies between the pistons L4 and M4. This compartment is shown enlarged during the "power stroke" and it will cause the pistons and rotors to deliver the thrust from the power stroke to the output shaft H as will hereafter be described. A spark plug 47 is associated with the compartment 46. Another compartment 48 is formed between the pistons M4 and L3 and this compartment has been reduced in capacity during its "exhaust stroke" for expelling the burnt gases through the exhaust ports 37a. A spark plug 49 is associated with this compartment.

I will now describe how the rotors L, and M are rotated with respect to each other for causing their pistons L3, L4, M3 and M4 to move so as to cause the compartments, 42, 44, 46 and 48 to vary in capacity and each perform the four cycles of intake, compression, power stroke and exhaust each time the particular compartment is carried through one complete revolution. In FIGURES 5 and 6 I show the cylindrical portion L1 of the rotor L enclosing the cylindrical insert J, the latter being keyed to the cylindrical portion L1 so as to be rotated by the rotor L. The cylindrical portion M1 of the motor M, likewise is keyed to the cylindrical insert K so that the two will rotate as a unit. The inner ends of the inserts J and K, abut each other. FIGURE 5 shows them in partial elevation so as to show a helical slot 50 in the insert J and a helical slot 51 in the insert K.

Figures 71, 81, 91:
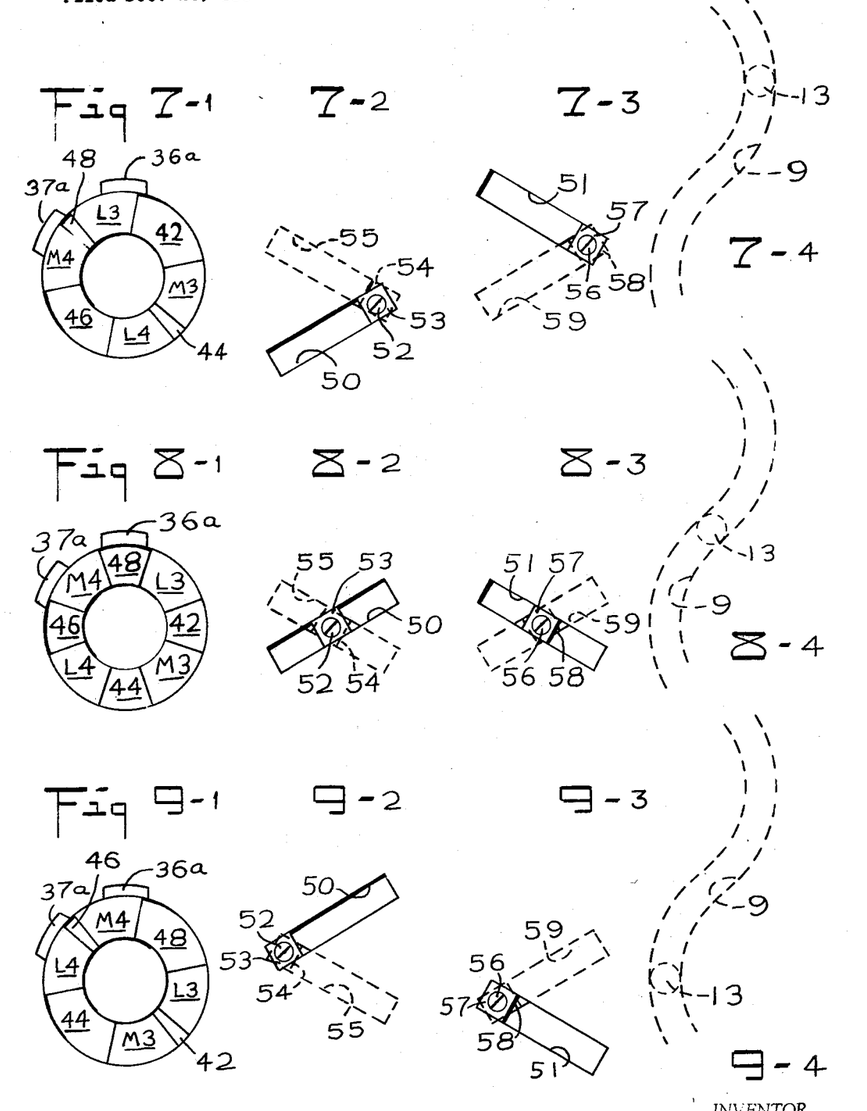

FIGURE 6 illustrates how the cylindrical insert J is operatively connected to the hollow output shaft H and to the shuttle sleeve F that is mounted within the interior of the shaft and encloses the shuttles E. A coupling stud 52 has an essentially square block 53 rotatably mounted thereon and being slidably receivable in the helical slot 50 of the insert J. A second square block 54 is rotatably mounted on the stud 52 and below the block 53, the second block 54 being slidably received in a helical slot 55 provided in the hollow shaft H and being inclined in the opposite direction from the slot 50, see also the diagrammatic showing of the two slots 50 and 55 in FIGURE 7. This latter FIGURE 7 indicates the slot 50 in full lines and as extending through a spiral having an angular arc of 16°. The other slot 55 in the hollow output shaft H is shown dotted and as extending in an opposite spiral direction through an angular arc of 16°. The square blocks or slidable shoes 53 and 54 are indicated at the right hand ends of both slots. The inner end of the stud 52 is threaded and is anchored in a threaded bore provided in the shuttle sleeve F, see FIGURE 6. There are two coupling studs 52 disposed 180° apart and they each have a pair of rotatable blocks or shoes 53 and 54 that slide in helical slots 50 and 55. A description of one suffices for both.

In like manner another coupling stud 56 has a square block 57 rotatably mounted thereon and being slidably receivable in the helical slot 51 provided in the other cylindrical insert K, see FIGURE 5. Then in FIGURES 7–3, the stud 56 is shown provided with a second square block 58 that slides in a helical slot 59 provided in the hollow shaft H. The second square block 58 is mounted under the outer square block 57. The helical slot 59 is inclined in an opposite direction from the slot 51 and both extend through arcuate angles of 16°. The diagrammatic showing in FIGURE 7 illustrates the two blocks 57 and 58 disposed at the right hand ends of the two slots 51 and 59. The inner end of the stud 56 is threaded into a threaded bore provided in the shuttle sleeve G. There are two coupling studs 56 although only one is shown, and these are disposed 180° apart and each carries the blocks or shoes 57 and 58 that slide in the slots 51 and 59.

It is best now to describe by way of example, one complete rotation of the two rotors L, and M to show how their pistons L3 and M3, respectively, are moved so as to effect the variations in capacity of one of the compartments 42. FIGURE 7 shows, diagrammatically at 7–1 the two pistons in relation to each other and to the intake port 36a. At 7–2, the two helical slots 50 (in the cylindrical insert J) and 55 (in the hollow output shaft H) are shown when the pistons L3 and M3 are in the position indicated at 7–1. Then at 7–3 in FIGURE 7, the other two helical slots 51 (in the cylindrical insert K) and 59 (in the hollow output shaft H) are shown in a position at the same instant of time. Then again at FIGURE 7–4, a portion of the cam groove 9 in the interior of the hollow shaft H, is indicated by two parallel rows of dotted lines and one of the two ball bearings 13 is shown in its proper place in the cam groove at the same instant of time. The use of two ball bearings placed 180° apart will create a balancing force on the shuttle E when causing it to reciprocate during the operation of the rotary engine. Also the use of pairs of studs or converter pins 52 and 56 are used for their balancing effect when the engine is operating as well as for the additional wearing surfaces and strength the pairs of blocks or shoes 53 and 57 will provide. The coupling studs 52 and 56 are reciprocated along the length of their common axis by the shuttle E, but they are free to be rotated as their blocks or shoes 53, 54 and 57, 58 are moved along the helical slots 50, 55 and 51, 59. The shuttle E is reciprocated by the ball bearings 13 that in turn ride in the cam groove 9. The cam groove has four loops in it, two of the loops being disposed 180° apart and extending in the same axial direction while the other two loops are also disposed 180° apart and extend in the opposite axial direction to the first two. This is for the purpose of causing the two diametrically opposed ball bearings 13 to create a uniform reciprocatory movement on the shuttle E. The square arbor D prevents the shuttle E from rotating while it is being reciprocated because the arbor is integral with the central support C.

Instead of the square blocks 53 and 54 being rotatably mounted on the coupling stud 52, it is possible to have the stud provided with integral square portions similar to the two blocks and have these portions ride in the slots 50 and 55. The same could be true of the coupling stud 56 and the substitution of integral portions having the same shape and angles as the blocks 57 and 58. The blocks or integral portions on the coupling studs are contoured correspondingly to the helical grooves. The helical grooves 55 in the shaft H extend at an angle of about 30° clockwise while the helical grooves 59 in the same shaft extend at an opposite angle of about 30° counterclockwise when looking at the right hand end of FIGURE 1. The helical grooves 50 in the cylindrical insert J extend at an angle of about 30° counterclockwise while the helical grooves 51 in the other cylindrical insert K extend at an angle of about 30° clockwise, see FIGURE 7. The pins or studs 52 and 56 are interconnecting units for converting the functions of the rotors L, and M to that of an evenly distributed power to the output shaft H. The pair of coupling studs 52 are used as the power converting units for the rotor L while the coupling studs 56 are used as the power converting units for the rotor M. Each set of coupling studs 52 and 56 convert different rates of rotor rotation of the rotors L, and M to the output shaft H. The helical slots 50 and 55, see FIGURE 7–2, extend at opposite angles to each other and so do the helical slots 51 and 59, see FIGURE 7–3. If one set of coupling studs converts a faster rotor speed to the slower speed of the shaft H during a stroke, conversely the other set of coupling studs, during the same stroke, must convert a slower rotor speed to that of the faster rotating shaft H. The driving mechanism of the engine requires a relative change in the rotating speeds of the two rotors with respect to each other and with respect to the output shaft H. This relative change in speeds between the two rotors is eight times to each complete revolution of the rotors. This means four changes of speed for each rotor during one revolution. Each rotor is continually moving at a speed essentially either faster or slower than its facing rotor.

I will start the description of the operation of the engine with the pistons L4 and M3 forming the compartment 44 where the two pistons have compressed the gas. The firing of this gas by the spark plug 45 produces the power stroke. FIGURE 14 illustrates how the spark plug is carried by the rotor M and when the spark plug is fired, it will explode the gas in the compartment 44 formed by the pistons L4 and M3 and the portions of the annular grooves L2 and M2 that lies between these two pistons. FIGURE 3 shows the radial arm 3 as carrying a timing device that will contact each one of the four spark plugs 43, 45, 47 and 49 as the latter are carried by it during the rotation of the rotor M, and will cause them to fire.

During the power stroke the leading piston L4 (the pistons are rotating clockwise in FIGURES 7, 8 and 9) in FIGURE 7 will rotate with the rotor L, 122° and the following piston M3 will rotate with its rotor M, 58° into the exploding mixture in the compartment 44. The rotor L will rotate its insert J through an arc of 122° and the helical slot 50 will likewise rotate through the same arc. The output shaft H will be rotated through a less arc of 90° because the coupling stud 52 will travel along the oppositely diverging helical slots 50 and 55 in the insert J and the shaft H, respectively. The stud 52 is moved parallel to the length of the engine axis by the shuttle E and the latter is moved by the ball bearings 13 riding in the cam groove 9.

The stud 51 will likewise be moved by the shuttle E and it will move along the oppositely diverging helical slots 51 in the insert K and 59 in the output shaft H to rotate the rotor through an arc of 58° while rotating the shaft H through the same arc of 90°. In FIGURE 8 the moveable engine parts are illustrated in a position after the output shaft H has rotated 45° from its position shown in FIGURE 7. At this position the compartment 44 is still enlarging during the power stroke and the piston L4 has rotated more rapidly than the piston M3. At this position all four compartments 44, 46, 48 and 42 are all the same size. The coupling studs 52 and 56 have moved half way along the pairs of slots 50, 55 and 51, 59, respectively.

In FIGURE 9, the compartment 44 is fully expanded after the output shaft has rotated another 45° from the position shown in FIGURE 8 and a full 90° from that shown in FIGURE 7. The coupling studs 52 and 56 have now been moved to the extreme left hand ends of the pairs of slots 50, 55 and 51, 59, and the ball bearings have moved to the end of the left hand loop in the cam groove 9.

During the next 90° rotation of the output shaft H, the rotor M, with its piston M3 will be speeded up to rotate through an arc of 122°, while the rotor L will be slowed down to move its piston L4 through an arc of 58°. In FIGURE 10 the piston M3 has rotated to the position shown and the piston L4 has partially uncovered the exhaust port 37a. The exhaust gases will start to escape through the exhaust port from the compartment 44 that is being compressed in its capacity by the two pistons M3 and L4. The output shaft H, not shown in FIGURE 10 has rotated through an arc of 45°.

Diagrammatic FIGURE 11 shows the completion of the exhaust stroke with the compartment 44 compressed to a small capacity by the piston M3 rotating faster than the piston L4. The output shaft has rotated another 45° from that of the same pistons shown in FIGURE 10. Then in FIGURE 12, I show the compartment 44 registering with the intake port 36a to receive a combustible gas. The piston L4 is now rotating more rapidly than the piston M3 and the constantly enlarging compartment 44 will tend to draw the gas into it. The output shaft will now have rotated 45° beyond the position it had occupied in FIGURE 11.

FIGURE 13 illustrates the pistons L4 and M3 in a position where the compartment is completing its "intake stroke" and the pistons M3 will now start rotating faster than the piston L4 to start the compression stroke. Again the output shaft has rotated another 45° from the position of the pistons shown in FIGURE 12. The final 45° rotation of the shaft to complete one revolution from the position shown in FIGURE 7, will return the pistons M3 and L4 back to the positions shown in this figure and the compressed gases will be ready for exploding by the firing of the spark plug 45. While the compartment 44 is moving through these power, exhaust, intake and compression phases, the other three compartments are likewise moving through their successive phases. This will provide multiple power strokes to the output shaft for each revolution thereof.

The work delivered by the internal combustion engine is both directed through the coupling studs 52 and 56, blocks 53, 54, 57 and 58 to the shaft H and through the coupling studs and blocks through the shuttle E and back to the shaft H. Some specific movements of the coupling studs and blocks in relation to the shaft H are represented in the diagrammatical FIGURES 7, 8 and 9. These figures show how the combustion force exerted on the coupling studs and blocks deliver a force that is directed in a clockwise direction on the output shaft H. The work performed by the engine is produced by an association of all of the moving parts of the internal mechanism. I will now explain a portion of the work not directly delivered to the output shaft by the coupling studs.

Referring to FIGURES 8–1 and 8–2, the combustion that is taking place in the compartment 44 between the pistons L4 and M3 imparts a clockwise force on the insert J and its integral groove 50, forcing the pair of coupling studs 52 counterclockwise and this is the rotation that is necessary to convert to the rotational speed of the output shaft as has already been explained. Referring to FIGURE 8–3, the counterclockwise resistance of the piston M3 also directs the coupling studs 56 which are in the grooves 51, in a counterclockwise direction. These forces continue through the coupling studs 52 and 56, through the blocks 53, 54 and 57, 58 respectively, causing an axially directed force through the shuttle E, the ball bearings 13 and onto the cam groove 9. These forces therefore impart to the output shaft H, a clockwise thrust in FIGURE 8–4. This is the result of the essentially angular displacement of the cam groove 9 which circumrotates around the pair of ball bearings 13 encompassing half of these units while at the same time the ball bearings are impelled by the axial movement of the shuttle. The clockwise rotational force on the shaft H is maintained in succeeding strokes of the shuttle because as the angle of the cam groove essentially changes the axial force on the shuttle reverses.

The various novel features of the rotary engine are as follows:

Compression springs 15 and 17 for moving the two rotors L, and M toward each other and causing them to act on the inner bearing and sealing insert Q, and the outer bearing and sealing insert R to make a fluid tight seal between the pistons and the rotor arcuate grooves. There is a uniform sealing of the fluids encountered in the engine.

The two rotors L, and M are practically symmetrical to each other and this includes the pistons that are integral with these rotors. The heat will be distributed rapidly through the pistons because they are integral with the rotors. The area of heat radiation from the pistons is greatly increased because the inner surfaces of the piston walls are exposed directly to the atmosphere. The concentric near symmetry of the various rotary engine parts makes it possible for the engine to operate at higher temperatures and this will result in a saving of fuel.

The stator B of the rotary engine is freed from the heat problems because it functions mainly as a carrier for the two rotors L, and M, and other associate parts and these are spaced from the stator so that air can pass between the stator and the two rotor peripheries.

The stator B, prevents the rotation of the outer bearing and sealing unit R, that also has the intake and exhaust ports. The inner bearing and sealing unit Q rotates with one of the rotors L.

The various parts produce a rotary engine that has a high power to weight ratio. The ringless pistons reduce the friction between the pistons and the walls of the arcuate grooves in which they travel.

The novel rotating low silouetted firing devices which are one to each of the four chambers, permit a far better fiiring efficiency for the combustible gases for this type of rotary engine.

I claim:
1. A rotary engine comprising:
   (a) a stator;
   (b) a rotor having an annular groove therein whose wall is semi-cylindrical in radial cross section, said rotor having two diametrically opposed pistons integral therewith and dividing said groove into two equal arcuate portions;
   (c) a complemental rotor having an annular groove therein similar to the first-mentioned groove and cooperating therewith to form an annular compartment, said complemental rotor having two diametrically opposed pistons integral therewith and dividing the groove in said complemental rotor into two equal arcuate portions, said last-named piston being similar to said first-mentioned pistons and being slidably receivable in the two equal arcuate portions in said first-mentioned rotor while said first-mentioned pistons are slidably receivable into the two equal arcuate portions in said complemental rotor, the four pistons dividing the equal arcuate portions in both rotors into four gas-receiving compartments;
   (d) means for rotatably mounting said rotors in said stator to rotate about a common axis and for causing said rotors to rotate with respect to each other at varying speeds to cause said pistons on both rotors to vary the capacities of said four compartments so that each compartment will follow through a four cycle sequence of enlarging in capacity to receive a combustible gas, contracting in capacity to compress the gas, again being enlarged by the exploding gas and then being contracted to expel the burnt gases;
   (e) means for feeding a combustible gas into each compartment while the compartment is being enlarged in capacity to receive the gas;
   (f) means for firing the gas in each compartment when the compartment is contracted for compressing the gas therein;

(g) means for exhausting the burnt gas from each compartment during the contracting of the compartment for this purpose;
(h) said rotors have a periphery of the same diameter; and
(i) said stator having an opening for receiving both rotors, the diameter of the stator opening being greater than the diameter of the rotor peripheries;
(j) whereby air can pass between the stator and the rotor peripheries for cooling purposes.

2. A rotary engine comprising;
(a) a stator;
(b) a rotor having an annular groove therein whose wall is semi-cylindrical in radial cross section, said rotor having two diametrically opposed pistons integral therewith and dividing said groove into two equal arcuate portions;
(c) a complemental rotor having an annular groove therein similar to the first-mentioned groove and cooperating therewith to form an annular compartment, said complemental rotor having two diametrically opposed pistons integral therewith and dividing the groove in said complemental rotor into two equal arcuate portions, said last-named pistons being similar to said first-mentioned pistons and being slidably receivable in the two equal arcuate portions in said first-mentioned rotor while said first-mentioned pistons are slidably receivable in the two sequal arcuate portions in said complemental rotor, the four pistons dividing the equal arcuate portions in both rotors into four gas-receiving compartments;
(d) means for rotatably mounting said rotors in said stator to rotate about a common axis and for causing said rotors to rotate with respect to each other at varying speeds to cause said pistons on both rotors to vary the capacities of said four compartments so that each compartment will follow through a four cycle sequence of enlarging in capacity to receivve a combustible gas, contracting in capicity to compress the gas, again being enlarged by the exploding gas and then being contracted to expel the burnt gases;
(e) means for feeding a combustible gas into each compartment while the compartment is being enlarged in capacity to receive the gas;
(f) means for firing the gas in each compartment when the compartment is contracted for compressing the gas therein; and
(g) means for exhausting the burnt gas for each compartment during the contracting of the compartment for this purpose;
(h) the pistons in both rotors being substantinally semi-cylindrical in radical section with the interior of each piston being open to the atmosphere so as to be air cooled.

3. A rotary comprising:
(a) a stator;
(b) a rotor having an annular groove therein whose wall is semi-cylindrical in radial cross section, said rotor having two diametrically opposed pistons integral therewith and dividing said groove into two equal arcuate portions;
(c) a complemental rotor having an annular groove therein similar to the first-mentioned groove and cooperating therewith to form an annular compartment, said complemental rotor having two diametrically opposed pistons integral therewith and dividing the groove in said complemental rotor into two equal arcuate portions, said last-named pistons being similar to said first-mentioned pistons and being slidably receivable in the two equal arcuate portions in said first-mentioned rotor while said first-mentioned pistons are slidably receivable in the two equal arcuate portions in said complemental rotor, the four pistons dividing the equal arcuate portions in both rotors into four gas-receiving compartments;
(d) means for rotatably mounting said rotors in said stator to rotate about a common axis and for causing said rotors to rotate with respect to each other at varying speeds to cause said pistons on both rotors to vary the capacities of said four compartments so that each compartment will follow through a four cycle sequence of enlarging in capacity to receive a combustible gas, contracting in capacity to compress the gas, again being enlarged by the exploding gas and then being contracted to expel the burnt gases;
(e) means for feeding a combustible gas into each compartment while the compartment is being enlarged in capacity to receive the gas;
(f) means for firing the gas in each compartment when the compartment is contracted for compressing the gas therein; and
(g) means for exhausting the burnt gas from each compartment during the contracting of the compartment for this purpose;
(h) said gas firing means including at least four spark plugs these being carried by one or more of said rotors, at least one spark plug being in each compartment so that they can ignite the gas in its associate compartment; and
(i) means carried by said stator for successively contacting each spark plug to a source of current for firing the compressed gases in the compartment;
(j) said spark plugs remaining in their respective compartments regardless of the capacity changes of the compartments.

4. A rotary engine comprising:
(a) a stator;
(b) a rotor having an annular groove therein whose wall is semi-cylindrical in radial cross section, said rotor having two diametrically opposed pistons integral therewith and dividing said groove into two equal arcuate portions;
(c) a complemental rotor having an annular groove therein similar to the first-mentioned groove and cooperating therewith to form an annular compartment, said complemental rotor having two diametrically opposed pistons integral therewith and dividing the groove in said complemental rotor into two equal arcuate portions, said last-named pistons being similar to said first-mentioned pistons and being slidably receivable in the two equal arcuate portions in said first-mentioned rotor while said first-mentioned pistons are slidably receivable in the two equal arcuate portions in said complemental rotor, the four pistons dividing the equal arcuate portions in both rotors into four gas-receiving compartments;
(d) means for rotatably mounting said rotors in said stator to rotate about a common axis and for causing said rotors to rotate with respect to each other at varying speeds to cause said pistons on both rotors to vary the capacities of said four compartments so that each compartment will follow through a four cycle sequence of enlarging in capacity to receive a combustible gas, contracting in capacity to compress the gas, again being enlarged by the exploding gas and then being contracted to expel the burnt gases;
(e) means for feeding a combustible gas into each compartment while the compartment is being enlarged in capacity to receive the gas;
(f) means for firing the gas in each compartment when the compartment is contracted for compressing the gas therein;
(g) means for exhausting the burnt gas from each compartment during the contracting of the compartment for this purpose;
(h) an inner bearing and sealing insert is disposed between said rotors for contacting with all four pistons along the lengths thereof; and (i) an outer bearing and sealing insert disposed between said rotors and contacting with all four pistons along the lengths thereof and substantially diametrically across from the contact made on the pistons by said inner bearing sealing insert.

5. The combination as set forth in claim 4 and in which:
(a) said inner bearing and sealing insert has an annular sectional portion that is wedge-shaped in cross section, the outer surfaces of this portion bearing against similarly sloped annular grooves in said rotors so that a yielding pressure tending to move the two rotors toward each other will result in said insert being moved toward said pistons for sealing purposes;
(b) said outer bearing and sealing insert having a sectional annular portion that is wedge-shaped in cross section and has its outer surfaces bearing against similarly sloped annular grooves in said rotors so that a yielding pressure on said rotors tending to move them axially toward each other will cause said outer insert to move toward said pistons for sealing purposes; and
(c) yielding means for urging said rotors toward each other.

6. The combination as set forth in claim 4, and in which:
(a) the inner bearing and sealing insert is comprised of at least three portions, a center portion being affixed to said first-mentioned rotor; said center portion being ring-shaped centrally with two projections sealingly contacting the two pistons integral with said first-mentioned rotor and contacting along the piston peripheries on their sides nearest the rotor axis, and with
(b) at least two arcuate portions having a shape to fit in recesses formed between adjacent projections of said center portion and located therein, the arcuate portions having parallel ends allowing inward or outward movement for sealingly and movingly contacting at least two piston peripheries on their sides nearest the rotor axis and those pistons being integral to the said second-mentioned rotor.

7. The combination as set forth in claim 4, and in which:
(a) said stator is ring-shaped and has clearance openings for receiving said intake and exhaust means which project from said outer bearing and sealing insert, said stator extending around the outer peripheries of the rotors;
(b) means for supporting said stator; and in
(c) means carried by said stator for preventing rotation of said outer ring-shaped bearing and sealing insert; said bearing and sealing insert divided semi-circularly into two arcuate portions with one of the portions having arcuate extensions overlapping and constituting a seal with the other arcuate portion; and
(d) said outer bearing and sealing insert having a gas inlet port communicating with said four compartments as each is being enlarged; and said sealing insert having a gas outlet port communicating successively with said four compartments during each revolution of said rotors for that compartment as it is being contracted for expelling the burnt gas therefrom; and with
(e) yielding means for urging said outer bearing and sealing insert to communicate sealingly and movingly against said pistons.

8. In a rotary engine:
(a) a stator having a bearing;
(b) a hollow shaft having one end rotatably supported by said bearing;
(c) a shuttle slidably mounted in said hollow shaft;
(d) means for preventing rotation of said shuttle;
(e) means for reciprocating said shuttle in said shaft during the rotation of said shaft;
(f) two sleeves rotatably mounted on said shuttle and enclosed in said shaft and caused to reciprocate with said shuttle;
(g) two cylindrical inserts rotatably mounted on said shaft;
(h) a rotor keyed to one insert so as to rotate therewith and having an annular groove therein with two diametrically opposed integral pistons dividing said groove into two equal arcuate portions;
(i) a complemental rotor keyed to the other insert so as to rotate therewith and having an annular groove therein similar to said first-mentioned groove and cooperating therewith to form an annular compartment, said complemental rotor having two diametrically opposed integral pistons dividing the groove in said complemental rotor into two equal arcuate portions and being slidably received in the two arcuate groove portions in said first-mentioned rotor while said first-mentioned pistons are slidably received in the two arcuate portions in said complemental rotor, the four pistons dividing the arcuate portions in both rotors into four gas-receiving compartments;
(j) said cylindrical inserts having helical slots therein extending in a predetermined direction and said hollow shaft having helical slots therein extending in another predetermined direction;
(k) a radially extending coupling stud carried by one sleeve and being slidably receivable in one of the helical slots in said hollow shaft and being slidably receivable in a helical slot in one of said cylindrical inert that is keyed to said first mentioned rotor;
(l) a second radially extending coupling stud carried by the other sleeve and being slidably received in another helical slot in said shaft and being slidably received in another helical slot in the other cylindrical insert that is keyed to said complemental rotor;
(m) whereby a rotation of said shaft will cause said shuttle reciprocating means to reciprocate said shuttle and said shuttle sleeves within said hollow shaft and to reciprocate said coupling studs for causing the latter to move in the helical slots in said shaft and cylindrical inserts for varying the rotational speeds between the two rotors for causing their pistons to move in the arcuate groove portions of the adjacent rotor in a predetermined manner for varying the capacities of the four gas-receiving compartments in a predetermined manner.

9. The combination as set forth in claim 8; and in which:
(a) the means for reciprocating said shuttle in said shaft includes a cam groove provided in the inner cylindrical surface of said hollow shaft; and
(b) ball bearings carried in pockets in said shuttle and being free to travel in said cam groove, the shape of the groove being such as to cause said shuttle to move completely through four strokes for each revolution of said shaft.

10. The combination as set forth in claim 8, and in which:
(a) the two cylindrical inserts abut each other;
(b) conical bearings for said rotors mounted on said hollow shaft and having their inner ends bearing against the outer ends of said inserts; and
(c) spring means mounted on said shaft and contacting said conical bearings for urging them toward each other for taking up any wear.

11. The combination as set forth in claim 8, and in which:
(a) each rotor has a bearing receiving portion;
(b) a bearing for each rotor and receivable in said bearing receiving portion; and (c) spring means for urging said bearings and their associate rotors toward each other.

References Cited

UNITED STATES PATENTS

| | | | | |
|---|---|---|---|---|
| 1,095,034 | 4/1914 | Sanchez et al. | 91—60 |
| 2,734,489 | 2/1956 | Tschudi | 123—11 |
| 3,244,156 | 4/1966 | Curtiss | 123—11 |
| 3,381,669 | 5/1968 | Tschudi | 123—11 |

MARK M. NEWMAN, Primary Examiner

A. D. HERRMANN, Assistant Examiner

U.S. Cl. X.R.

418—38